US009652782B2

(12) United States Patent
Sanghavi et al.

(10) Patent No.: US 9,652,782 B2
(45) Date of Patent: May 16, 2017

(54) INTERACTION-AWARE ADVERTISING FOR MINIMIZING BANNER BLINDNESS

(71) Applicant: Apple Inc., Cupertino, CA (US)

(72) Inventors: Mehul K. Sanghavi, Sunnyvale, CA (US); Michael Froimowitz Greenzeiger, Sunnyvale, CA (US); Ravindra Phulari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 13/897,219

(22) Filed: May 17, 2013

(65) Prior Publication Data
US 2014/0344055 A1 Nov. 20, 2014

(51) Int. Cl.
G06Q 30/02 (2012.01)

(52) U.S. Cl.
CPC ..... G06Q 30/0267 (2013.01); G06Q 30/0272 (2013.01)

(58) Field of Classification Search
None
See application file for complete search history.

(56) References Cited

U.S. PATENT DOCUMENTS

| 7,904,062 | B2 | | 3/2011 | Ashkenazi et al. | |
|---|---|---|---|---|---|
| 8,631,356 | B2 | * | 1/2014 | Lai et al. | 715/863 |
| 2004/0107439 | A1 | * | 6/2004 | Hassell et al. | 725/44 |
| 2007/0276729 | A1 | * | 11/2007 | Freer | 705/14 |
| 2009/0254824 | A1 | | 10/2009 | Singh | |
| 2010/0083191 | A1 | * | 4/2010 | Marshall | 715/863 |
| 2010/0222046 | A1 | * | 9/2010 | Cumming | 455/418 |
| 2011/0035263 | A1 | | 2/2011 | Ramanathan | |

* cited by examiner

Primary Examiner — Rutao Wu
Assistant Examiner — Alfred Tsui
(74) Attorney, Agent, or Firm — Polsinelli LLP

(57) ABSTRACT

Systems, methods, and non-transitory computer-readable storage media for interaction-aware advertising to minimize banner blindness. First, the system concurrently displays, via a graphical user interface, an advertisement and application content. Next, the system detects a user interaction with the application content. Based on the user interaction, the system then locks the advertisement within a viewable area of display for concurrent display at the graphical user interface with a portion of the application content, wherein the advertisement is configured to remain locked until an unlocking event is detected.

22 Claims, 6 Drawing Sheets

INTERACTION-AWARE ADVERTISING FOR MINIMIZING BANNER BLINDNESS

TECHNICAL FIELD

The present technology pertains to mobile advertisements, and more specifically pertains to scroll-panel advertising on mobile applications for greater conversion efficacy.

BACKGROUND

Digital advertisements have become a widely popular means for advertising products and targeting specific consumers. The current, widespread use and popularity of mobile devices has enabled advertisers to reach a far broader audience than before, using digital advertisements. Digital advertisements also allow users to seek desired products and advertisements directly from their mobile device, at any time convenient to the user. Not surprisingly, both users and advertisers have capitalized on the convenience and popularity of mobile devices to frequently buy and sell products using digital advertisements on mobile devices.

Advertisers generally configure their digital advertisements to be displayed along with media content accessed by the user. The digital advertisement is typically presented as a display banner at a fixed position in the screen of the user's device, to allow the user to view the advertisement as he or she accesses media content from the device. However, display advertising using fixed, or static, position banners is prone to 'banner blindness' which overtime reduces its effectiveness and efficacy for conversion. Banner blindness is used to describe a common phenomenon, where users consciously or subconsciously ignore banner-like information when they browse through content. This phenomenon is also present in the context of display banner advertising on mobile devices.

Given the relatively small screen and real estate available in mobile devices for positioning advertisements, the current standard for display advertisement positioning is at the top or bottom of the mobile applications. Several technology advances have made it possible to render higher quality display banners, which can help fight banner blindness. In particular, several formats, such as rich media expandable advertisement format, IAB OPA format, and the 'takeover' format, have been implemented in an attempt to overcome banner blindness in the desktop environment. However, these desktop banner formats do not have counterparts on the mobile medium, likely because they would be deemed by users to be extremely intrusive and annoying. Yet banner blindness remains a significant problem in digital advertisement in the mobile context. In fact, banner blindness is commonly aggravated in the mobile context. For example, in the mobile context, the user is often highly engaged on a small screen with mobile applications, and, thus, more likely to ignore any advertisements. Many times, the user is engaged in gaming content, which may not permit simultaneous interaction with advertising content. As a result, the user is similarly unlikely to notice any advertisements. Thus, current banner technologies have significant limitations, and, in many cases, are ineffective, particularly in the mobile context.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be implemented to avoid banner blindness and increase conversion efficacy in display advertising. Moreover, these approaches can be effectively implemented in mobile advertising, with limited intrusion and annoyance to the user. Advertisements can be positioned with media content and adapted in a way that ensures that users have an opportunity to view and notice the advertisements, and reduces the likelihood that a user will ignore the advertisement. This can lead to greater conversion efficacy, and better use of the limited real estate available for display advertising.

Disclosed are systems, methods, and non-transitory computer-readable storage media for interaction-aware advertising to minimize banner blindness. The system can concurrently display, via a graphical user interface, an advertisement and application content. Here, the system can display the advertisement and application content at the same time, or together. The system can display the advertisement within the application content, above the application content, below the application content, parallel to the application content, near the application content, combined with the application content, in a proximity to the application content, in relation to the application content, etc. For example, the advertisement can be a top-anchored advertisement, a bottom-anchored advertisement, an embedded advertisement, a separate advertisement, a display banner, etc. The application content can be associated with an application launched at the system. For example, the application content can be social content in a social networking application launched at the system. The application content can include any type of content, such as text, audio, video, and/or any media content. Moreover, the application can be any type of software application, including mobile applications, for example.

The system can then detect a user interaction with the application content. The user interaction can include, for example, a user selection of application content, a tapping of application content by the user, a scroll request, a launch request, a request to open content, a request to close content, a request to edit content, a request to interact with content, a swipe request, a gesture, a command, etc. The user can provide the input via an input device, such as a mouse, a keyboard, a microphone, a camera, a joystick, a sensor, a scanner, a touchscreen, a light pen, a touchpad, a remote, a gamepad, a stylus, and so forth. For example, the user can launch a mobile gaming application on the system and interact with the mobile gaming application by tapping an icon on the screen of the system. The user can also interact with the gaming application using gestures captured by the system and/or tapping the screen of the system at different times, for example. The system can receive these inputs from the user, and process the inputs accordingly.

Based on the user interaction, the system can lock the advertisement within a viewable area of display for concurrent display at the graphical user interface with a portion of the application content, wherein the advertisement is configured to remain locked until an unlocking event is detected. This way, the advertisement can be presented to the user along with the application content, at least until the unlocking event is detected. By locking the advertisement, the system can ensure that the user notices the advertisement and does not otherwise ignore it. The locking of the advertisement can counter, overcome, and/or minimize any banner blindness that would otherwise be experienced by the user. For example, the locking of the advertisement can ensure that the user notices the advertisement.

The locking of the advertisement can prevent the user and/or system from removing or dismissing the advertisement until the advertisement is unlocked. While the advertisement is locked, the system can continue to display the advertisement and application content. Thus, the user can continue to view both the application content and the advertisement, even while the advertisement is locked. In some embodiments, the user can also continue to interact with the application content while the advertisement is locked. Here, the advertisement can remain in a viewable area of the display until the unlocking event is detected. In other embodiments, the system can lock the application content at the same time it locks the advertisement, so the user cannot browse or move through the application content until the advertisement is unlocked. In such cases, the user can still view the application content while it is locked; however, the user cannot navigate to a different portion of the application content (i.e., application content that is not in a viewable area of the display) until the application content is unlocked.

The unlocking event can include an expiration of time, a user request to dismiss the advertisement, a user selection of the advertisement, a timer alarm, a display condition, and so forth. For example, if the advertisement is configured to be locked for thirty seconds, the unlocking event can be the lapse of thirty seconds after the advertisement is locked. The unlocking event can also be based on other thresholds, metrics, and settings, such as a number of user views, a number of user selections, a number of user clicks, a number of attempts to access the application content, the amount of time for locking the advertisement, the type of content of the application, the number of advertisements to be displayed, the type of display device, the time of day, the duration of the advertisement and/or application content, a profile of the user, the type of advertisement, the position of the advertisement, the type of application content, the context of the user, user preferences, advertiser preferences, user feedback, advertisement performance, etc.

The system can present to the user other information associated with the advertisement, such as an amount of time elapsed since the advertisement was locked, an amount of time remaining until the advertisement is unlocked, a condition that must be satisfied for the advertisement to be unlocked, a description of the unlocking event, a display threshold, an object to allow the user to submit a request to dismiss the advertisement, etc. For example, the system can present a timer indicating the amount of time left until the advertisement is unlocked. As another example, the system can present an object that allows the user to submit a request to dismiss and/or unlock the advertisement. The advertisement can be configured to receive input from the user and adapt its lock settings and/or unlocking event settings based on the input. For example, the advertisement can be configured to receive input from the user indicating that the user has viewed and/or accessed the advertisement, and dismiss or unlock the advertisement based on the user's viewing and/or access of the advertisement. The advertisement can include, for example, an input field for the user to acknowledge the advertisement or otherwise mark the advertisement as viewed. This way, the system can receive an indication that the user has acknowledged and/or viewed the advertisement, and consequently dismiss or unlock the advertisement from display. The advertisement can also include a field or object to allow the user to manually dismiss or unlock the advertisement. For example, if the user does not want to wait for the unlocking event, the user can manually dismiss or unlock the advertisement. Moreover, the advertisement can be configured to launch an expanded version of the advertisement based on the input of the user. For example, the advertisement can be configured to launch an expanded version of the advertisement when the user taps and/or selects the advertisement.

In some embodiments, the system can detect the user interaction, and, in response, activate a timer indicating an amount of time the advertisement is configured to remain locked. The system can also display the timer along with the advertisement. The system can present an indication to the user informing the user that the advertisement will remain locked until the time in the timer expires. The system can then unlock the advertisement once the time in the timer expires. In some cases, the system can present a notification to the user when the advertisement is unlocked, to alert the user that the advertisement has been unlocked.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for effectively countering banner blindness in advertising. A system, method and computer-readable media are disclosed for interaction-aware advertising to minimize banner blindness. A brief introductory description of an exemplary configuration of devices and a network is disclosed herein. A more detailed description of interaction-aware and scroll-panel advertising will then follow. These variations shall be described herein as the various embodiments are set forth. The disclosure now turns to FIG. 1.

Figure 1:
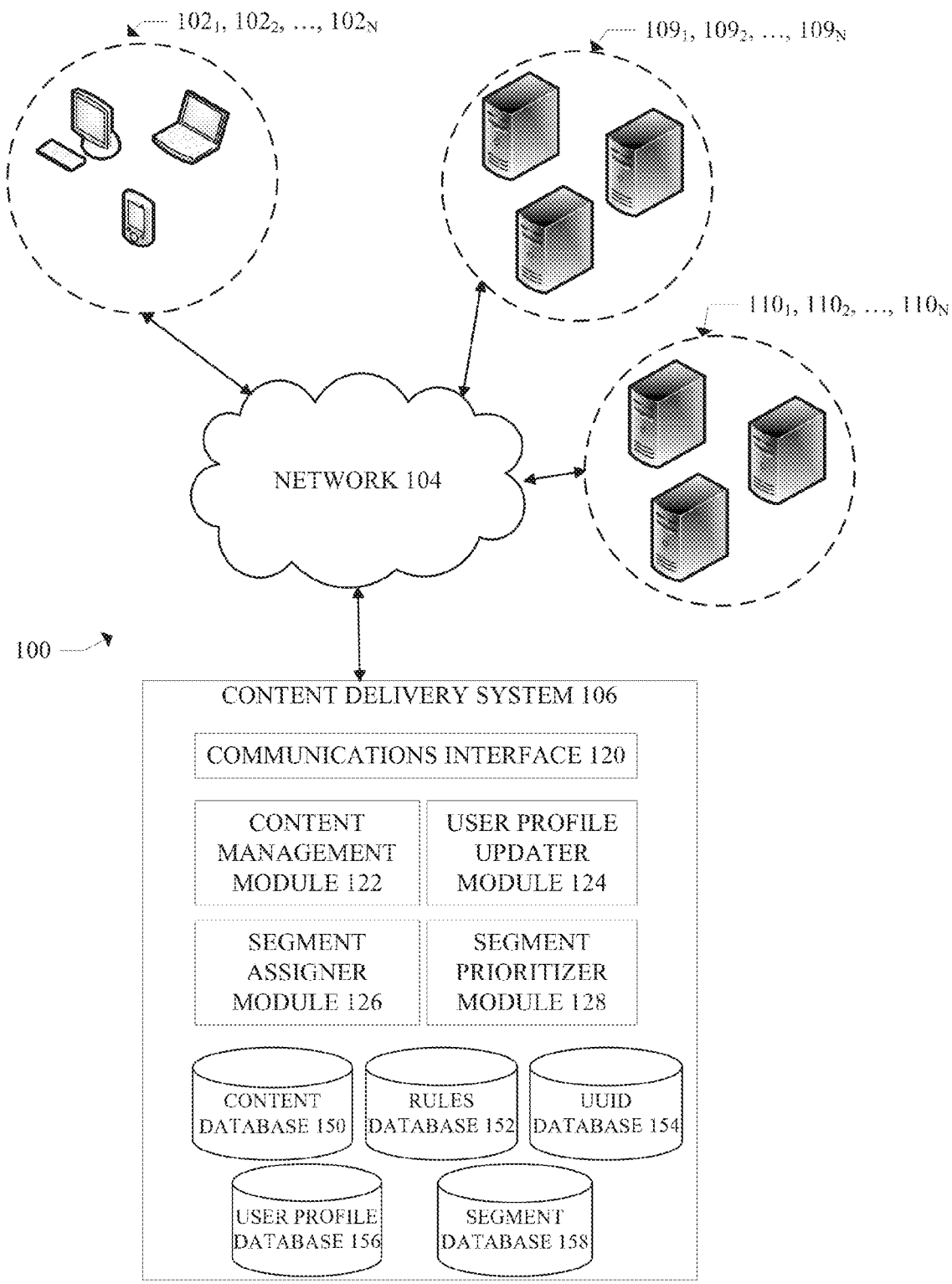
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content, such as advertisements, can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, ..., $109_n$ (collectively "109") and content from one or more secondary content providers $110_1$, $110_2$, ... $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app. As used herein, the terms "app", "software application", "application", and the like, refers to one or more portions of computer software designed to cause the user terminal to perform one or more specific tasks. Such tasks can include tasks beyond the running of the user terminal. However, the present disclosure contemplates that tasks performed by an app can also include tasks for running the user terminal.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

The content delivery system 106 can monitor and/or tract user interactions with the user terminal $102_i$, and make adjustments to the delivery and/or presentation of invitational content based on the user interactions. For example, the content delivery system 106 can deliver invitational content to the user terminal $102_i$ and monitor the user's interaction with the invitational content, or any other content, at the user terminal $102_i$. When the content delivery system 106 detects a user interaction, it can send an instruction to the user terminal $102_i$ to lock or freeze the invitational content on the display of the user terminal $102_i$ until an unlocking event is detected by the content delivery system 106 and/or the user terminal $102_i$. The locking or freezing of the invitational content can ensure that the invitational content remains visible at the user terminal $102_i$ for the duration of the locking or freezing. The unlocking event can be, for example, a lapse of time, an expiration of content and/or a timer, a request from the user, an input from the user, a condition that is met or satisfied, etc.

In some embodiments, the content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 156 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The disclosure now turns to a discussion of banner blindness in advertising. Banner blindness is used to describe a common phenomenon, where users consciously or subconsciously ignore banner-like information when they browse through content. Banner blindness is common in display advertising, which is often prone to banner blindness. The likelihood and magnitude of banner blindness is even greater in the mobile context, as many factors common to the mobile context can aggravate banner blindness. For example, in the mobile context, the user is often highly engaged on a small screen with mobile applications, and, thus, less likely to notice any advertisements.

Figure 2:
FIG. 2 illustrates an example configuration for targeting content based on context-switching data points.

Interaction-aware advertising can be used to overcome or minimize banner blindness, and increase advertising efficacy. Interaction-aware advertising can also be implemented to overcome or minimize banner blindness in the mobile context, which tends to be more prone to banner blindness. FIG. 2 illustrates an example configuration 200 for an interaction-aware advertisement. The configuration 200 includes an advertisement 204 displayed as a top-anchored banner on the application 210 at the device 202. In this example, the application 210 is a news application displaying a news article 212. However, as one of ordinary skill in the art will readily recognize after reading this disclosure, the application 210 can be any software application, and can display any type of content, such as text, video, audio, interactive content, and/or any other type of media content. Moreover, the device 202 can be any type of user device, such as user terminal $102_i$.

The advertisement 204 can be locked in its current position in the display, or any other position in the viewable area of the display. The advertisement 204 can be locked in response to an attempt by the user to interact with the application 210 and/or the news article 212. For example, the advertisement 204 can be locked in response to an attempt by the user to browse to a different page of the news article 212 in the application 210, an attempt by the user to edit the news article 212, an attempt by the user to save and/or send the news article 212, an attempt by the user to scroll to a different position in the news article 212, etc. The device 202 can detect the user's interaction with the application 210 and/or the news article 212, which can trigger the locking of the advertisement 204. By locking the advertisement 204, the device 202 can ensure that the user will notice the advertisement 204, thereby minimizing the likelihood of banner blindness. When the advertisement 204 is locked, the user is unable to remove the advertisement 204 or interact with the application 210 and/or the news article 212. For example, when the advertisement 204 is locked, the user cannot scroll up or down the news article 212, or browse to a different page of the news article 212. As a result, the user has to wait until the advertisement 204 is unlocked to interact with the application 210 and/or the news article 212. Accordingly, the user will likely notice the advertisement 204 as he or she waits until the advertisement 204 is unlocked in order to interact with the application 210 and/or the news article 212. Thus, by locking the advertisement 204, the device 202 can minimize the likelihood of banner blindness and increase the efficacy of the advertisement 204.

The advertisement 204 can remain locked until the device 202 detects an unlocking event. The unlocking event can include an expiration of time, a user request to dismiss the advertisement 204, a user selection of the advertisement 204, a timer alarm, a display condition, and so forth. For example, if the advertisement 204 is configured to be locked for thirty seconds, the unlocking event can be the lapse of thirty seconds after the advertisement 204 is locked. The unlocking event can also be based on other thresholds, metrics, and settings, such as a number of user views, a number of user selections, a number of user clicks, a number of attempts to access the application 210 and/or its content, the amount of time available for locking the advertisement 204, the type of content of the application 210, the number of advertisements to be displayed by the device 202, the type of display and/or device 202, the time of day, the duration of the advertisement 204 and/or application content, a profile of the user, the type of advertisement 204, the position of the advertisement 204, the context of the user, user preferences, advertiser preferences, user feedback, advertisement performance, etc.

The advertisement 204 can include a timer 206 indicating an amount of time remaining until the advertisement 204 is unlocked. In some cases, the timer 206 can indicate the amount of time that the advertisement 204 has been locked. If the unlocking event is a condition other than a time-related condition, the advertisement 204 can include an indication of the condition that must be satisfied in order to unlock the advertisement 204. For example, if the unlocking event is a third scroll attempt by the user, the advertisement 204 can include an indication that three scroll attempts must be detected for the advertisement 204 to be unlocked. The indication can also include other information associated with the condition of the unlocking event. For example, the indication can include a counter of scroll attempts, which can display the number of scroll attempts that have been detected and/or the number of additional scroll attempts that must be detected for the condition of the unlocking event to be satisfied. Thus, the advertisement 204 can include any type of information describing the unlocking event and/or any associated requirements, and/or any indication of status or progress associated with the unlocking event and/or any of the associated requirements.

In some embodiments, the advertisement 204 can include a user input field 208 for obtaining input from the user. The user input field 208 can provide one or more options associated with the advertisement 204. For example, the user input field 208 can include an option for the user to acknowledge the advertisement 204. By acknowledging the advertisement 204, the user can modify the display and/or conditions of the advertisement 204. For example, in some cases, the user can unlock the advertisement 204 by acknowledging the advertisement 204 through the user input field 208. In other cases, the device 202 may require the user to acknowledge the advertisement 204 before it initiates or triggers a timer for unlocking the advertisement 204. Thus, the advertisement 204 remains locked, and a timer for unlocking the advertisement 204 is not activated and started until the user acknowledges the advertisement 204 via the user input field 208. In still other cases, the user can decrease the time required for the advertisement 204 to be unlocked by acknowledging the advertisement 204 through the user input field 208. For example, the advertisement 204 can be set to lock for 30 seconds if no input is received from the user or 15 seconds after the user acknowledges the advertisement 204 via the user input field 208. Thus, if the user never acknowledges the advertisement 204, the advertisement is not unlocked until the 30 second lock time expires. On the other hand, if 2 seconds into the 30 second lock time, the user acknowledges the advertisement 204 via the user input field 208, then the advertisement 204 would be unlocked 15 seconds after the user submits the acknowledgment. This would result in a total 17 seconds of lock time for the advertisement 204.

The user input field 208 can also provide other options associated with the advertisement 204 and/or the unlocking event. For example, the user input field 208 can include an option for the user to manually dismiss the advertisement 204. In this example, the user can select the option to dismiss the advertisement 204 in order to manually remove the advertisement 204 from display. Other options that can be included in the user input field 208 include, for example, an option to interact with the advertisement 204; an option to switch to a different, possibly related, advertisement; an option to navigate between advertisements; an option to select a different condition and/or unlocking event; an option to enter user information; an option to select user preferences; an option to have the advertisement 204 sent or emailed to the user; an option to tag the advertisement 204; an option to request that the advertisement 204 be presented at a future time; an option to post the advertisement 204 on a social network; etc.

Figure 3:
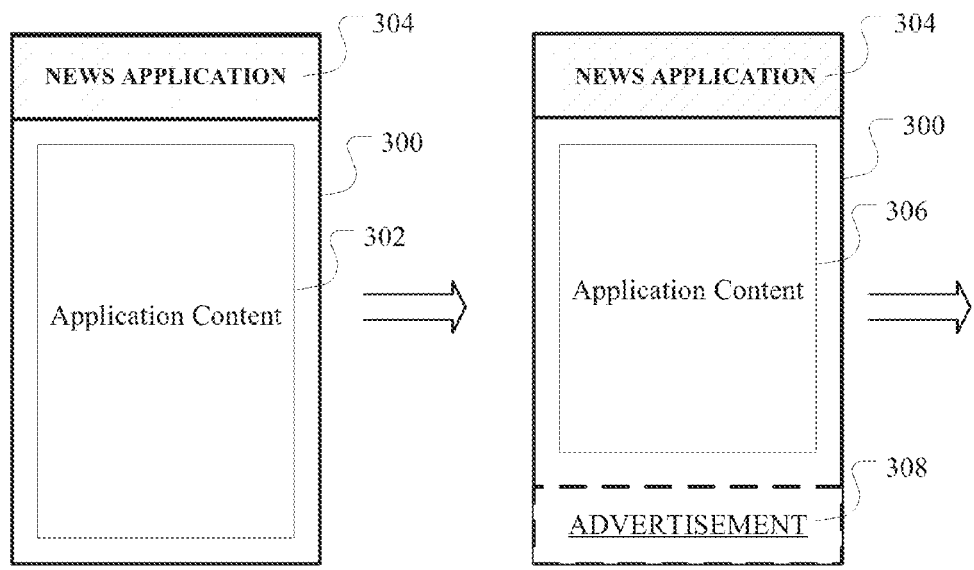
FIG. 3 illustrates example interactions with an interaction-aware advertisement.
Figure 3:
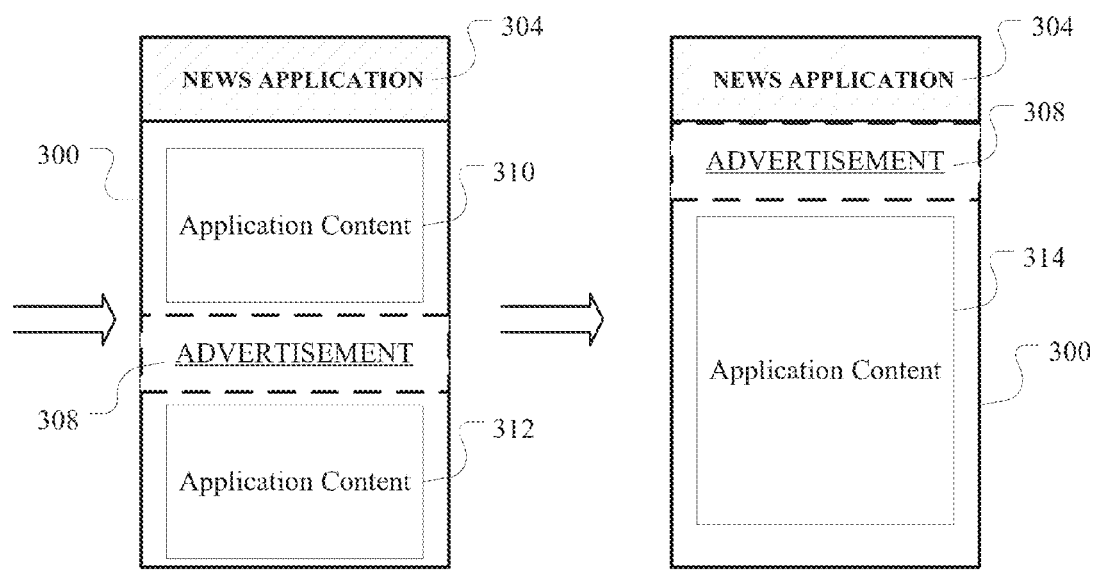

FIG. 3 illustrates example interactions with an interaction-aware advertisement. The display 300 first presents application content 302 for an application 304. The user can scroll down to view the next portion of application content 306. As the user scrolls down, the advertisement 308 reaches a viewable area of the display 300, and is thus presented in the display 300. The user can continue scrolling down to view additional application content 310, 312, including application content 312 located below the advertisement 308. The advertisement 308 also can continue to move up as the user moves down to the application content 310, 312. The user can scroll down to view the next portion of application content 314, located below the application content 312 that was previously in the viewable area of the display 300, until the advertisement 308 reaches the top of the display 300.

In some embodiments, the advertisement 308 can be locked when the advertisement 308 reaches the top of the display. In other embodiments, the advertisement is not locked until the user tries to scroll down more to view the next portion of application content after the application content 314, and move the advertisement 308 outside of the viewable area of the display 300. Here, the system can detect the user's attempt to scroll down and lock the advertisement within the viewable area of the display 300. When locked, the user can, in some cases, scroll back up to the previous portions of application content 312, 310, 306, 302. In other cases, the user cannot scroll back up to the previous portions of application content 312, 310, 306, 302. The advertisement 308 can remain locked until the system detects an unlocking event. Once the unlocking event is detected, the advertisement 308 can be unlocked and the user can navigate to any portion of application content. In some cases, the user can dismiss and/or remove the advertisement 308 once the advertisement 308 is unlocked.

The unlocking event can include an expiration of time, a user request to dismiss the advertisement 308, a user selection of the advertisement 308, a timer alarm, a display condition, and so forth. For example, if the advertisement 308 is configured to be locked for thirty seconds, the unlocking event can be the passing of thirty seconds after the advertisement 308 is locked. The unlocking event can also be based on other thresholds, metrics, and settings, such as a number of user views, a number of user selections, a number of user clicks, a number of attempts to access application content, the amount of time for locking the advertisement 308, the type of content of the application 304, the number of advertisements to be displayed, the type of display device, the time of day, the duration of the advertisement 308 and/or application content, a profile of the user, the type of advertisement, the position of the advertisement 308, the type of application content, the context of the user, user preferences, advertiser preferences, user feedback, advertisement performance, etc.

Figure 4:
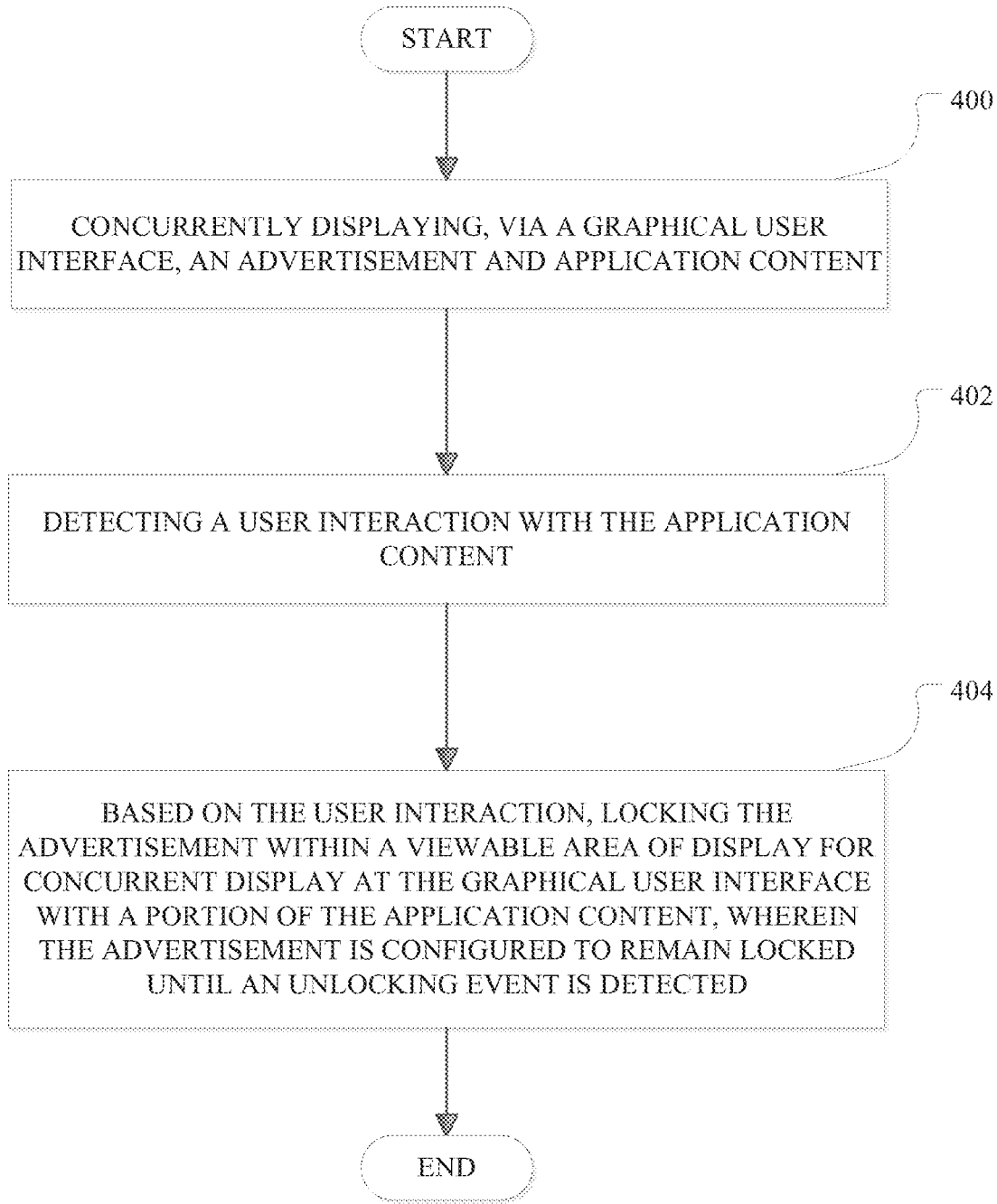
FIG. 4 illustrates a first example method embodiment.

Having disclosed some basic system components and concepts, the disclosure now turns to the exemplary method embodiment shown in FIG. 4. For the sake of clarity, the method is described in terms of the user terminal $102_i$, as shown in FIG. 1, configured to practice the method. The steps outlined herein are exemplary and can be implemented in any combination thereof, including combinations that exclude, add, or modify certain steps.

FIG. 4 illustrates a first example method embodiment. First, the user terminal $102_i$ concurrently displays, via a graphical user interface, an advertisement and application content (400). Here, the user terminal $102_i$ can display the advertisement and application content at the same time or together. The user terminal $102_i$ can display the advertisement within the application content, above the application content, below the application content, parallel to the application content, near the application content, combined with the application content, in a proximity to the application content, in relation to the application content, etc. The advertisement can be a top-anchored advertisement, a bottom-anchored advertisement, an embedded advertisement, a separate advertisement, etc. For example, the advertisement can include invitational content embedded within the application content. In some cases, the advertisement can be a display banner for a mobile application. The application content can be associated with an application launched at the user terminal $102_i$. For example, the application content can be social content in a social networking application launched at the user terminal $102_i$. The application can be any type of software application, including mobile applications. Moreover, the application content can include any type of content, such as text, audio, video, and/or any type of media content.

Next, the user terminal $102_i$ detects a user interaction with the application content (402). The user interaction can include, for example, a user selection of application content, a tapping of application content by the user, a scroll request, a launch request, a request to open content, a request to close content, a request to edit content, a request to interact with content, a swipe request, a gesture, a command, etc. The user can provide the input via an input device, such as a mouse, a keyboard, a microphone, a camera, a joystick, a sensor, a scanner, a touchscreen, a light pen, a touchpad, a remote, a gamepad, a stylus, and so forth. For example, the user can launch a mobile gaming application on the user terminal $102_i$ and browse content of the gaming application by tapping an icon on the screen of the user terminal $102_i$. The user can also interact with the gaming application using gestures captured by the user terminal $102_i$ and/or tapping the screen of the system at different times. The user terminal $102_i$ can receive these inputs from the user, and process the inputs accordingly.

Based on the user interaction, the user terminal $102_i$ then locks the advertisement within a viewable area of display for concurrent display at the graphical user interface with a portion of the application content, wherein the advertisement is configured to remain locked until an unlocking event is detected (404). This way, the advertisement can be presented to the user along with the application content, at least until the unlocking event is detected. By locking the advertisement, the user terminal $102_i$ can ensure that the user notices the advertisement and does not otherwise ignore it. Further, the locking of the advertisement can counter, overcome, and/or minimize any banner blindness that would otherwise be experienced by the user. Thus, the locking of the advertisement can ensure that the user notices the advertisement.

The locking of the advertisement can prevent the user and/or user terminal $102_i$ from removing or dismissing the advertisement until the advertisement is unlocked. While the advertisement is locked, the user terminal $102_i$ can continue to display the advertisement and application content. Thus, the user can continue to view both the application content and the advertisement, even while the advertisement is locked. In some embodiments, the user can also continue to interact with the application content while the advertisement is locked. Here, the advertisement can remain in a viewable area of the display until the unlocking event is detected. In other embodiments, the user terminal $102_i$ can lock the application content at the same time it locks the advertisement, so the user cannot browse or move through the application content until the advertisement is unlocked. In such cases, the user can still view the application content while it is locked; however, the user cannot navigate to a different portion of the application content (i.e., application content that is not in a viewable area of the display) until the application content is unlocked. The user cannot browse or navigate to a different portion of the application content until the advertisement is unlocked based on the unlocking event.

In some embodiments, the user can browse and/or scroll to other portions of application content as long as the advertisement remains within the area of display. For example, if the advertisement is positioned at the bottom of a page in display when the advertisement is locked, the user can scroll down the page until the advertisement reaches the top of the area of display. Here, when the user scrolls down the page to view other portions of application content, any content in the current area of display, including the advertisement, is shifted upwards to bring the new content from below into view. The user can continue to scroll down the page to view different portions of application content, until the advertisement is shifted from the bottom of the page to the top of the page. Once the advertisement reaches the top of the page and cannot be shifted upwards anymore without removing the advertisement from the area of display, the user will no longer be able to scroll down the page until the advertisement is unlocked. At this time, the user can, in some cases, scroll back up the page to view other portions of the application content, until the advertisement shifts to the bottom of the page once again. While the advertisement is locked, the user can continue to scroll up and/or down as the user desires, as long as the advertisement is maintained within the area of display. Once the advertisement is unlocked, the user can scroll to any portion of the application content without restriction.

The unlocking event can include an expiration of time, a user request to dismiss the advertisement, a user selection of the advertisement, a timer alarm, a display condition, and so forth. For example, if the advertisement is configured to be locked for thirty seconds, the unlocking event can be the lapse of thirty seconds after the advertisement is locked. The unlocking event can also be based on other thresholds, metrics, and settings, such as a number of user views, a number of user selections, a number of user clicks, a number of attempts to access the application content, the amount of time for locking the advertisement, the type of content of the application, the number of advertisements to be displayed, the type of display device, the time of day, the duration of the advertisement and/or application content, a profile of the user, the type of advertisement, the position of the advertisement, the type of application content, the context of the user, user preferences, advertiser preferences, user feedback, advertisement performance, etc.

In addition to the advertisement, the user terminal $102_i$ can also present additional information associated with the advertisement, such as an amount of time elapsed since the advertisement was locked, an amount of time remaining until the advertisement is unlocked, a condition that must be satisfied for the advertisement to be unlocked, a description of the unlocking event, a display threshold, an object to allow the user to submit a request to dismiss the advertisement, etc. For example, the user terminal $102_i$ can present a timer indicating the amount of time left until the advertisement is unlocked. As another example, the user terminal $102_i$ can present an object that allows the user to submit a request to dismiss and/or unlock the advertisement. The advertisement can be configured to receive input from the user and adapt its lock settings and/or unlocking event settings based on the input. For example, the advertisement can be configured to receive input from the user indicating that the user has viewed and/or accessed the advertisement, and dismiss or unlock the advertisement based on the user's viewing and/or access of the advertisement. The advertisement can include, for example, an input field for the user to acknowledge the advertisement or otherwise mark the advertisement as viewed. This way, the user terminal $102_i$ can receive an indication that the user has acknowledged and/or viewed the advertisement, and consequently dismiss or unlock the advertisement from display. The advertisement can also include a field or object to allow the user to manually dismiss or unlock the advertisement. For example, if the user does not want to wait for the unlocking event, the user can manually dismiss or unlock the advertisement. Moreover, the advertisement can be configured to launch an expanded version of the advertisement based on the input of the user. For example, the advertisement can be configured to launch an expanded version of the advertisement when the user taps and/or selects the advertisement.

In some embodiments, the user terminal $102_i$ can detect the input from the user, and, in response to the input from the user, activate a timer indicating an amount of time the advertisement is configured to remain locked. The user terminal $102_i$ can also display the timer along with the advertisement. The user terminal $102_i$ can present an indication to the user informing the user that the advertisement will remain locked until the time in the timer expires. The user terminal $102_i$ can then unlock the advertisement once the time in the timer expires. In some cases, the user terminal $102_i$ can present a notification to the user when the advertisement is unlocked, to alert the user that the advertisement has been unlocked.

The disclosure now turns to the exemplary method embodiment shown in FIG. 4. For the sake of clarity, the method is described in terms of content delivery system 106, as shown in FIG. 1, configured to practice the method. The steps outlined herein are exemplary and can be implemented in any combination thereof, including combinations that exclude, add, or modify certain steps.

Figure 5:
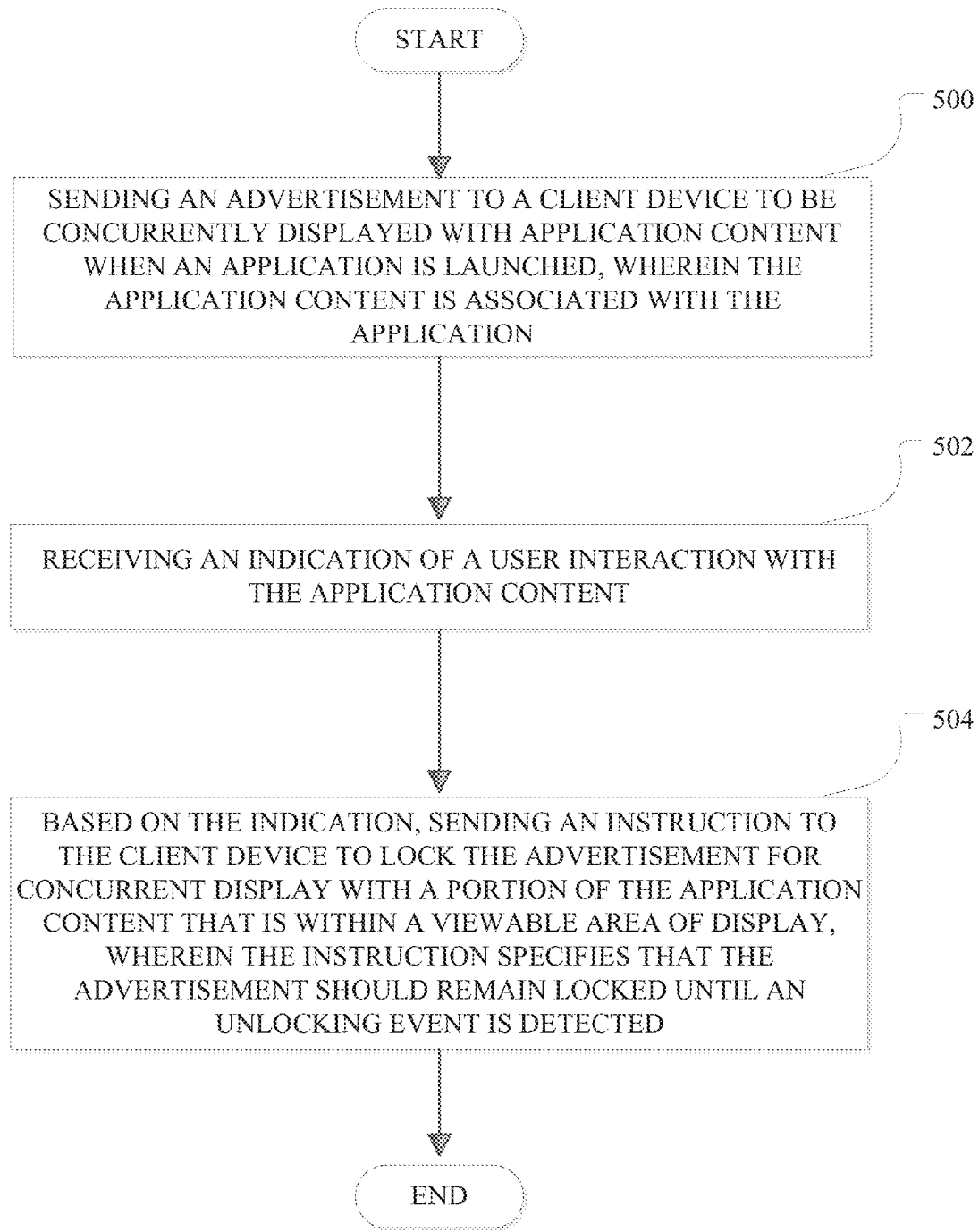
FIG. 5 illustrates a second example method embodiment.

FIG. 5 illustrates a second example method embodiment. First, the content delivery system 106 sends an advertisement to a client device to be concurrently displayed with application content when an application is launched, wherein the application content is associated with the application (500). The client device can be any device with networking capabilities, such as user terminal $102_i$ illustrated in FIG. 1. The content delivery system 106 can send the advertisement to the client device along with a setting, an instruction, and/or an indication specifying that the advertisement should be presented concurrently with the application content associated with the application. The application can be any software application, including mobile applications, for example.

Next, the content delivery system 106 receives an indication of a user interaction with the application content (502). The user interaction can be, for example, a scroll request, a navigation request, a link activation request, a selection, an input provided to the application from the user, etc. Based on the indication, the content delivery system 106 then sends an instruction to the client device to lock the advertisement for concurrent display with a portion of the application content that is within a viewable area of display, wherein the instruction specifies that the advertisement should remain locked until an unlocking event is detected (504). When the advertisement is locked, both the advertisement and a portion of the application content can remain visible to the user. Thus, the user can continue to view the application content along with the advertisement. However, in some cases, when the advertisement is locked, the user cannot browse to other portions of application content.

In other cases, the user can browse and/or scroll to other portions of application content as long as the advertisement remains within the area of display. For example, if the advertisement is positioned at the bottom of a page in display when the advertisement is locked, the user can scroll down the page until the advertisement reaches the top of the area of display. Here, when the user scrolls down the page to view other portions of application content, any content in the current area of display, including the advertisement, is shifted upwards to bring the new content from below into view. The user can continue to scroll down the page to view different portions of application content, until the advertisement is shifted from the bottom of the page to the top of the page. Once the advertisement reaches the top of the page and cannot be shifted upwards anymore without removing the advertisement from the area of display, the user will no longer be able to scroll down the page until the advertisement is unlocked. At this time, the user can, in some cases, scroll back up the page to view other portions of the application content, until the advertisement shifts to the bottom of the page once again. While the advertisement is locked, the user can continue to scroll up and/or down as the user desires, as long as the advertisement is maintained within the area of display. Once the advertisement is unlocked, the user can scroll to any portion of the application content without restriction.

The unlocking event can include an expiration of time, a user request to dismiss the advertisement, a user selection of the advertisement, a timer alarm, a display condition, and so forth. For example, if the advertisement is configured to be locked for thirty seconds, the unlocking event can be the lapse of thirty seconds after the advertisement is locked. The unlocking event can also be based on other thresholds, metrics, and settings, such as a number of user views, a number of user selections, a number of user clicks, a number of attempts to access the application content, the amount of time for locking the advertisement, the type of content of the application, the number of advertisements to be displayed, the type of display device, the time of day, the duration of the advertisement and/or application content, a profile of the user, the type of advertisement, the position of the advertisement, the type of application content, the context of the user, user preferences, advertiser preferences, user feedback, advertisement performance, etc.

Figure 6B:
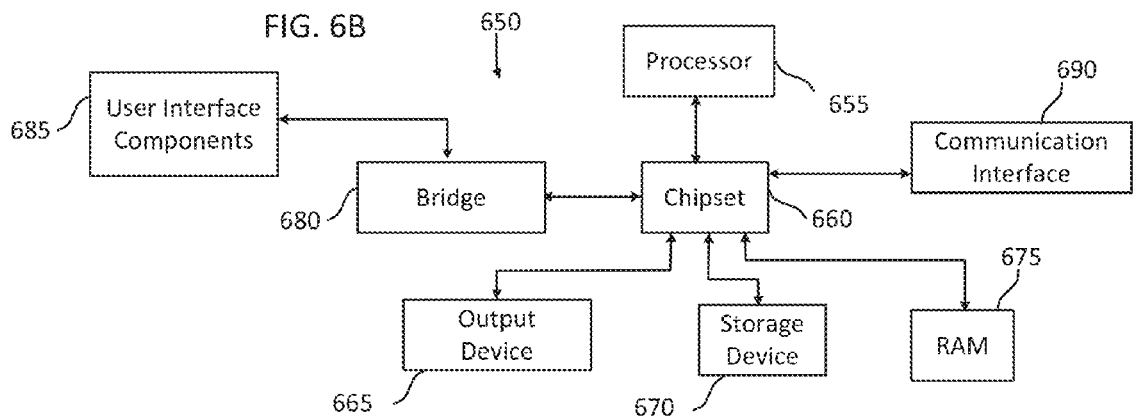
FIGS. 6A and 6B illustrate example system embodiments.
Figure 6A:
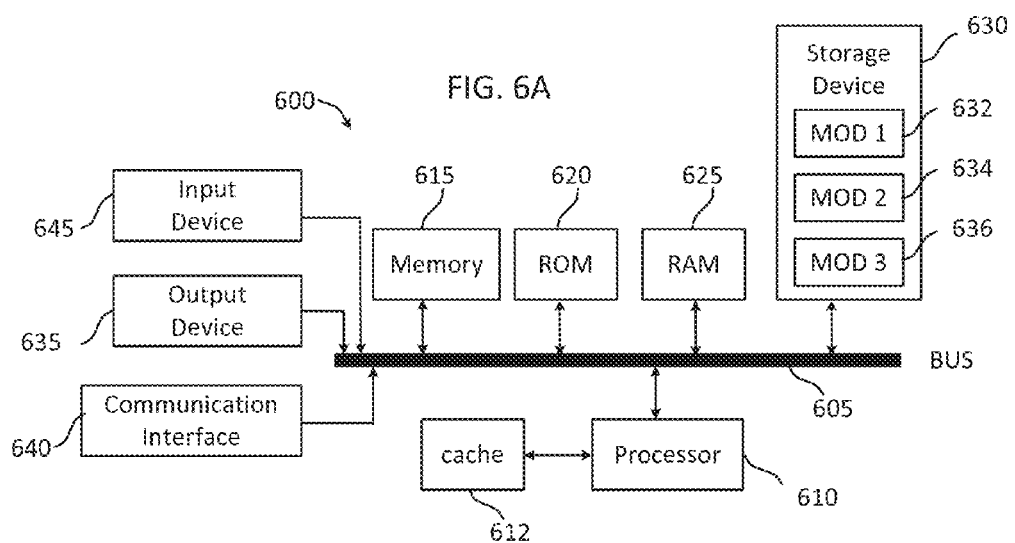

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures. Although a variety of examples and other information were used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim.

We claim:

1. A computer-implemented method comprising:
   concurrently displaying, via a graphical user interface of a user device, a first portion of a content page and secondary content;
   detecting a user interaction with the graphical user interface, the user interaction for scrolling toward a second portion of the content page, wherein the second portion is outside of a viewable area of the graphical user interface;
   determining whether navigating to the second portion of the content page would require the secondary content to be moved outside of the viewable area in order to move the second portion within the viewable area;
   when navigating to the second portion of the content page requires the secondary content to be moved outside of the viewable area, automatically restricting scrolling to the second portion; and
   when navigating to the second portion of the content page does not require the secondary content to be moved outside of the viewable area, automatically scrolling to the second portion of the content page to display the second portion of the content page and the secondary content within the viewable area.

2. The method of claim 1, further comprising prior to detecting the user interaction, locking the secondary content within the viewable area of the graphical user interface until an unlocking event is detected, wherein the unlocking event comprises at least one of an expiration of time and a user request to dismiss the secondary content.

3. The method of claim 1, wherein the secondary content comprises one of a top-anchored advertisement, a bottom-anchored advertisement, and an embedded advertisement.

4. The method of claim 1, wherein determining whether navigating to the second portion would require the secondary content to be moved outside of the viewable area is based on a proximity of the secondary content to a boundary of the viewable area of the graphical user interface.

5. The method of claim 1, wherein the content page is associated with a mobile application, and wherein the secondary content comprises a display banner for the mobile application.

6. The method of claim 1, wherein the secondary content is configured to launch an expanded version of the secondary content when a user selects the secondary content.

7. The method of claim 1, wherein restricting scrolling comprises locking the secondary content within the viewable area, the method further comprising in response to the user interaction, activating a timer indicating an amount of time the secondary content is configured to remain locked.

8. The method of claim 7, further comprising presenting the timer via the graphical user interface.

9. The method of claim 7, further comprising presenting an indication that the secondary content will remain locked until the time in the timer expires, and wherein the unlocking event comprises an expiration of the time in the timer.

10. The method of claim 1, wherein the secondary content is configured to receive input from the user indicating that the user has viewed the secondary content, and wherein the user can dismiss the secondary content by marking the secondary content as viewed.

11. A system comprising:
    a processor; and
    a computer-readable storage medium having stored therein instructions which, when executed by the processor, cause the processor to perform operations comprising:
      sending secondary content to a client device over a network to be concurrently displayed with a first portion of a content page in a graphical user interface of the client device when an application associated with the content page is launched at the client device;
      receiving an indication of a user interaction with the graphical user interface for scrolling toward a second portion of the content page, wherein the second portion is outside of a viewable area of the graphical user interface;
      determining whether navigating to the second portion of the content page would require the secondary content to be moved outside of the viewable area in order to move the second portion within the viewable area;
      when navigating to the second portion of the content page requires the secondary content to be moved outside of the viewable area, automatically restricting scrolling to the second portion; and
      when navigating to the second portion of the content page does not require the secondary content to be moved outside of the viewable area, automatically scrolling to the second portion of the content page to display the second portion of the content page and the secondary content within the viewable area.

12. The system of claim 11, the operations further comprising prior to detecting the user interaction, locking the secondary content within the viewable area of the graphical user interface until an unlocking event is detected, wherein the unlocking event comprises at least one of an expiration of time and a user request to dismiss the secondary content.

13. The system of claim 11, wherein the secondary content comprises one of a top-anchored advertisement, a bottom-anchored advertisement, and an embedded advertisement.

14. The system of claim 11, wherein the secondary content is configured to launch an expanded version of the secondary content when the user selects the secondary content.

15. The system of claim 11, the computer-readable storage medium storing additional instructions which, when executed by the processor, result in operations further comprising, in response to the indication, activating a timer indicating an amount of time the secondary content is configured to remain locked.

16. A non-transitory computer-readable storage medium having stored therein instructions which, when executed by a processor, cause the processor to perform operations comprising:
- concurrently displaying, via a graphical user interface, a first portion of a content page and secondary content;
- locking the secondary content for display at the graphical user interface within a viewable area of the graphical user interface until an unlocking event is detected;
- detecting a user interaction at the graphical user interface, wherein the user interaction comprises a request to scroll toward to a second portion of the content page, wherein the second portion is outside of a viewable area of the graphical user interface;
- determining whether navigating to the second portion of the content page would require the secondary content to be moved outside of the viewable area in order to move the second portion within the viewable area;
- when navigating to the second portion of the content page requires the secondary content to be moved outside of the viewable area, automatically restricting scrolling to the second portion; and
- when navigating to the second portion of the content page does not require the secondary content to be moved outside of the viewable area, automatically scrolling to the second portion of the content page to display the second portion of the content page and the secondary content within the viewable area.

17. The non-transitory computer-readable storage medium of claim 16, wherein the unlocking event comprises at least one of an expiration of time and a user request to dismiss the secondary content.

18. The non-transitory computer-readable storage medium of claim 16, storing additional instructions which, when executed by the processor, result in operations further comprising, if the unlocking event has been detected, navigating to the second portion of the application content in response to the user interaction, even if navigating to the second portion requires the secondary content to be moved outside the viewable area.

19. A method comprising:
- assembling a secondary content configured to be displayed in a graphical user interface at a client device concurrently with a first portion of a content page associated with a targeted application;
- generating instructions for:
  - detecting a user interaction with the graphical user interface, the user interaction for scrolling toward a second portion of the content page, wherein the second portion is outside of the viewable area of the graphical user interface locking the secondary content within a viewable area of the graphical user interface;
  - determining whether navigating to the second portion of the content page would require the secondary content to be moved outside of the viewable area in order to move the second portion within the viewable area;
  - when navigating to the second portion of the content page requires the secondary content to be moved outside of the viewable area, automatically restricting scrolling to the second portion; and
  - when navigating to the second portion of the content page does not require the secondary content to be moved outside of the viewable area, automatically scrolling to the second portion of the content page to display the second portion of the content page and the secondary content within the viewable area; and
- sending the secondary content and the instructions to the client device.

20. The method of claim 19, further comprising prior to detecting the user interaction, locking the secondary content within the viewable area of the graphical user interface until an unlocking event is detected, wherein the unlocking event comprises at least one of an expiration of time and a user request to dismiss the secondary content.

21. The method of claim 19, further comprising identifying the targeted application and matching the secondary content with the targeted application.

22. The method of claim 19, wherein determining whether navigating to the second portion would require the secondary content to be moved outside of the viewable area is based on a proximity of the secondary content and the second portion of the content page to a boundary of the viewable area of the graphical user interface.

* * * * *